United States Patent
Irizarry et al.

(10) Patent No.: US 12,277,437 B2
(45) Date of Patent: Apr. 15, 2025

(54) SYSTEM AND METHOD OF PATH EXECUTION OPTIMIZATION

(71) Applicant: Atlantic Technical Organization, San Juan, PR (US)

(72) Inventors: Gian Irizarry, San Juan, PR (US); Arturo Geigel, San Juan, PR (US)

(*) Notice: Subject to any disclaimer, the term of this patent is extended or adjusted under 35 U.S.C. 154(b) by 580 days.

(21) Appl. No.: 17/566,533

(22) Filed: Dec. 30, 2021

(65) Prior Publication Data
US 2023/0214252 A1 Jul. 6, 2023

(51) Int. Cl.
*G06F 9/46* (2006.01)
*G06F 9/451* (2018.01)

(52) U.S. Cl.
CPC .............. *G06F 9/466* (2013.01); *G06F 9/451* (2018.02)

(58) Field of Classification Search
None
See application file for complete search history.

(56) References Cited

U.S. PATENT DOCUMENTS

| | | | | | |
|---|---|---|---|---|---|
| 5,003,487 | A | * | 3/1991 | Drumm | G06F 30/327 716/108 |
| 5,325,525 | A | * | 6/1994 | Shan | G06F 9/52 718/104 |
| 5,365,463 | A | * | 11/1994 | Donath | G06F 30/3312 703/19 |
| 5,465,372 | A | * | 11/1995 | Gottlieb | G06F 9/4494 712/E9.046 |
| 5,848,437 | A | * | 12/1998 | Korst | G11B 20/12 |
| 11,240,278 | B1 | * | 2/2022 | Wang | H04L 65/4053 |
| 2007/0055558 | A1 | * | 3/2007 | Shanahan | G06Q 10/06 705/7.26 |
| 2007/0245300 | A1 | * | 10/2007 | Chan | G06Q 10/06 717/104 |
| 2008/0046833 | A1 | * | 2/2008 | Patz | G06Q 10/10 715/769 |
| 2008/0059967 | A1 | * | 3/2008 | Matsui | G06Q 10/00 718/102 |
| 2008/0215409 | A1 | * | 9/2008 | Van Matre | G06Q 10/0631 705/7.12 |
| 2009/0112344 | A1 | * | 4/2009 | Nackaerts | G06F 30/39 700/103 |
| 2010/0138268 | A1 | * | 6/2010 | Guo | G06Q 10/063 705/7.11 |
| 2010/0269102 | A1 | * | 10/2010 | Latorre | G06F 9/3861 717/130 |

(Continued)

*Primary Examiner* — Adam Lee
(74) *Attorney, Agent, or Firm* — Luis Figarella

(57) ABSTRACT

A system and method for optimization and validation of the machine learning tasks is proposed. The system allows for a graphical representation of the underlying parallel execution and allows the user the ability to determine the critical path of execution that will allow the system take advantage of processing capability of the available resources. The engine is capable of being aware of the machine learning task, its parallel execution constraints and the underlying heterogeneous infrastructure. This allows for optimal execution based on speed or reduced execution to comply with other constraints such as allowable time, costs, or other miscellaneous parameters. The disclosure also features a graphical user interface that displays the critical path on other instances besides computational workloads.

20 Claims, 15 Drawing Sheets

(56) References Cited

U.S. PATENT DOCUMENTS

| | | | | |
|---|---|---|---|---|
| 2012/0029959 A1* | 2/2012 | Elazouni | G06Q 10/00 | 705/7.23 |
| 2012/0060142 A1* | 3/2012 | Fliess | G06F 11/3457 | 717/102 |
| 2012/0130907 A1* | 5/2012 | Thompson | G06Q 10/103 | 705/301 |
| 2012/0185867 A1* | 7/2012 | Archer | G06F 9/5066 | 718/105 |
| 2012/0303560 A1* | 11/2012 | Sedaghat | G06N 7/02 | 706/13 |
| 2013/0024230 A1* | 1/2013 | Elazouni | G06Q 20/00 | 705/7.16 |
| 2013/0144679 A1* | 6/2013 | Burnett | G06Q 10/0631 | 705/7.27 |
| 2013/0290924 A1* | 10/2013 | March | G06Q 10/06 | 717/105 |
| 2013/0332221 A1* | 12/2013 | Fay | G06Q 10/06313 | 705/7.23 |
| 2013/0332992 A1* | 12/2013 | Kim | G06Q 10/06 | 726/2 |
| 2014/0019471 A1* | 1/2014 | Linton | G05B 19/418 | 707/759 |
| 2014/0122161 A1* | 5/2014 | Gupta | G06Q 10/06316 | 705/7.26 |
| 2014/0277666 A1* | 9/2014 | Morkos | G06Q 10/06313 | 700/100 |
| 2014/0343999 A1* | 11/2014 | Kim | G06Q 10/06313 | 705/7.23 |
| 2014/0350985 A1* | 11/2014 | Pink | G06Q 10/063118 | 705/7.17 |
| 2015/0046363 A1* | 2/2015 | McNamara | G06Q 10/0833 | 705/333 |
| 2015/0160969 A1* | 6/2015 | Kishore | G06F 11/3006 | 718/102 |
| 2015/0286969 A1* | 10/2015 | Warner | G06Q 10/0633 | 705/7.27 |
| 2015/0339209 A1* | 11/2015 | Kerr | G06F 11/34 | 717/131 |
| 2015/0347944 A1* | 12/2015 | Aparimit | G06Q 10/06313 | 705/7.23 |
| 2015/0356141 A1* | 12/2015 | Yan | G06F 16/284 | 707/718 |
| 2016/0140482 A1* | 5/2016 | Ertl | G06Q 10/063118 | 705/7.17 |
| 2016/0171413 A1* | 6/2016 | Kalyanaraman | G06Q 10/067 | 705/7.37 |
| 2017/0083396 A1* | 3/2017 | Bishop | G06F 11/14 | |
| 2017/0160781 A1* | 6/2017 | Piga | G06F 1/3287 | |
| 2018/0123918 A1* | 5/2018 | Steinhauser | H04L 43/0858 | |
| 2018/0181716 A1* | 6/2018 | Mander | G16H 50/20 | |
| 2018/0365061 A1* | 12/2018 | Narsude | G06F 16/951 | |
| 2019/0034783 A1* | 1/2019 | Liu | G06N 3/043 | |
| 2019/0205792 A1* | 7/2019 | Huang | G06F 9/4881 | |
| 2019/0384641 A1* | 12/2019 | Zhao | G06F 9/5027 | |
| 2020/0065152 A1* | 2/2020 | Parmar | G06F 9/5027 | |
| 2020/0081916 A1* | 3/2020 | McShane | G06N 20/00 | |
| 2020/0125448 A1* | 4/2020 | von Trapp | G06F 11/0793 | |
| 2020/0234146 A1* | 7/2020 | Lee | G06F 17/15 | |
| 2020/0303059 A1* | 9/2020 | Trindade Rodrigues | G06T 7/0012 | |
| 2020/0394583 A1* | 12/2020 | Sangekar | G06Q 10/06316 | |
| 2022/0129474 A1* | 4/2022 | Maduri | G06F 16/24554 | |
| 2022/0180245 A1* | 6/2022 | Geigel | G06N 20/00 | |
| 2023/0071278 A1* | 3/2023 | Karri | G06N 20/00 | |
| 2023/0161629 A1* | 5/2023 | Sajja | G06F 9/4881 | 718/104 |

\* cited by examiner

SYSTEM AND METHOD OF PATH EXECUTION OPTIMIZATION

STATEMENT REGARDING FEDERALLY SPONSORED RESEARCH AND DEVELOPMENT

N/A

RELATED APPLICATIONS

N/A

BACKGROUND OF THE INVENTION

Field of the Invention

The present invention relates to the field of parallel execution optimization and its graphical user interface. More specifically to optimize the execution of distributed machine learning tasks through determination of the critical path to determine the parallel execution environment of the individual tasks.

Discussion of the Background

Data mining and machine learning are based on complex algorithms that require expertise for proper execution. This is more critical when parallel execution with complex pre-processing and multiple algorithms is required. This can be represented as a complex workflow that requires taking into account not just greedy execution parameters but a holistic view of the workflow as a complex unit. The parallelization of this workflow is often implemented in a clustered environment that resides on a cloud platform. Within the cloud platform it can be assumed that the overall parallelization takes place across heterogeneous server systems. The parallelization on such heterogeneous systems can range from multi-threaded systems to systems that are multi core/multiprocessors, have graphical processing units (GPUs) or even embedded systems.

In addition to the complex hardware configuration, the complexity of the executing algorithm also has to be taken into consideration. This complicates the problem as that of matching execution programs to the appropriate resources so that execution finishes at the shortest time possible. The present disclosure describes the management of this problem by a system and process for matching the execution of programs to the appropriate resource. The present disclosure further describes a graphical user interface which may be used in industrial engineering processes and computing processes.

Shortcomings of the Prior Art

Traditionally parallel processing has tried to exploit the parallelism templates to organize execution in a distributed architecture. Single instruction multiple data paradigms exploit the regularity of the instruction as being the same which is copied to each server in a cluster, then slice the data and send chunks to each server. This type of analysis is acceptable when the paradigm is the same, but does not fare well when multiple paradigms are necessary.

Other types of execution just focus on greedy assignment, where a queue of jobs sends the head of the queue as soon as a server is available. The problem with this is that asymmetries in workload may happen, where a server with substantial resources is given a job for which such processing power is wasted. Other methods of compensation for this waste of processing relies on process migration. The limitation of this solution is that process migration itself consumes time.

DETAILED DESCRIPTION OF THE PREFERRED EMBODIMENTS

Figure 1:
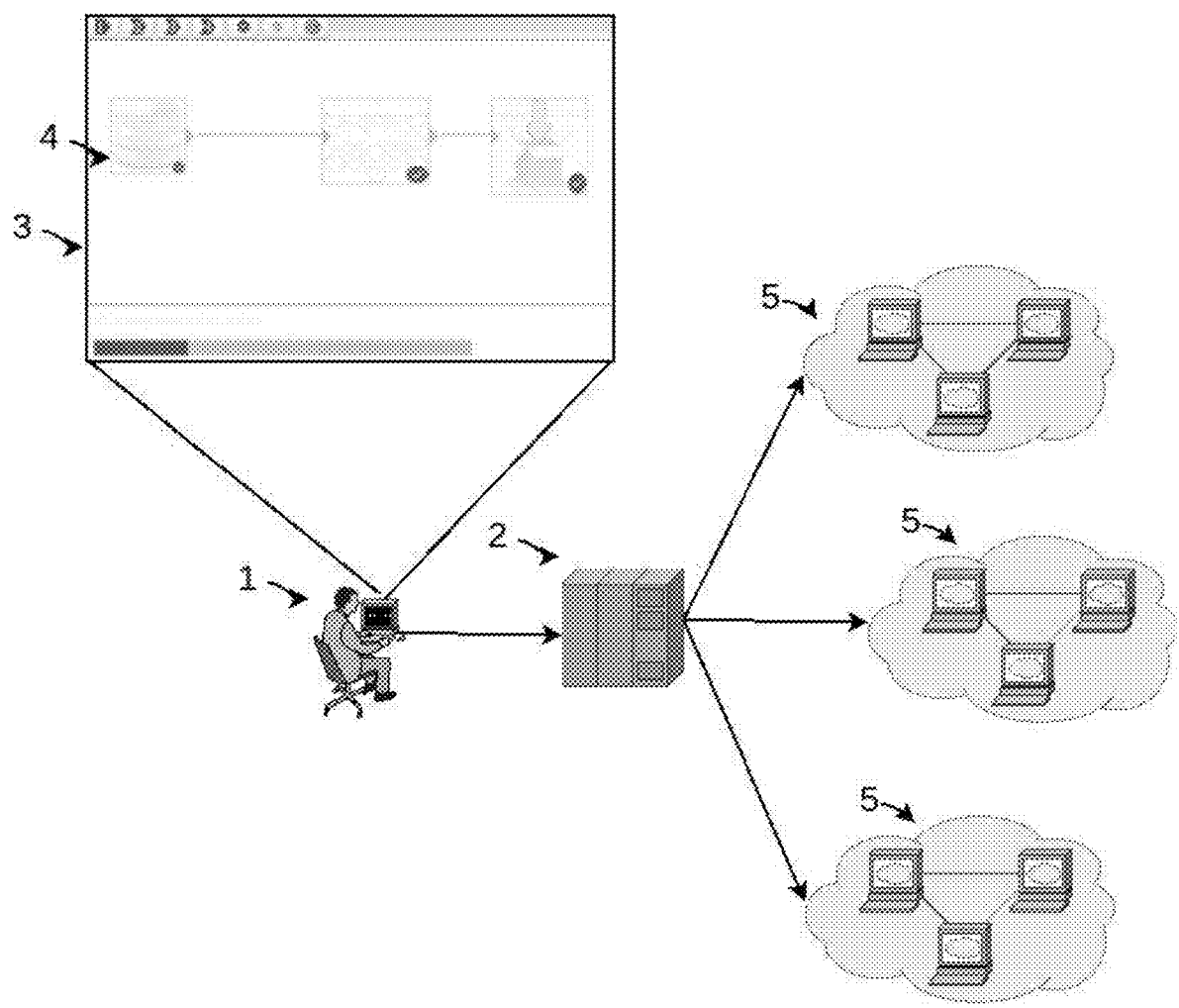
FIG. 1 Shows a typical embodiment of the actual system that performs the functions of the proposed invention.

FIG. 1 Shows a typical embodiment of the actual system that performs the functions of the proposed invention. The system is accessed by a user through a terminal 1. The terminal! is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to a distributed architecture 5.

Figure 2:
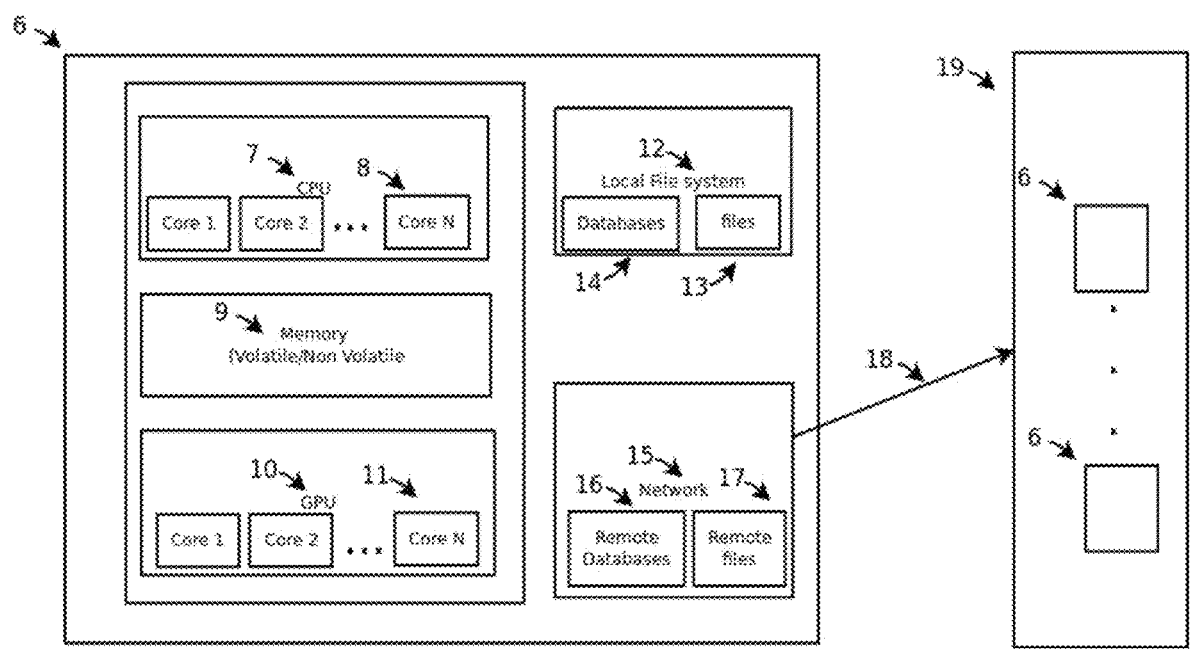
FIG. 2 Describes the physical layout of the typical execution environment on which the parallel execution will take place.

FIG. 2 Describes the physical layout of the typical execution environment on which the parallel execution will take place. A typical embodiment consists of a computer system 6 that contains a CPU 7 with a number of N cores 8. Then cores 8 is capable of doing multi-threading tasks on the CPU 7. The computer system 6 also contains a memory system 9 capable of storing information for processing by the CPU 7. The computer system 6 can also contain a compute capable GPU 10 with a number of N cores 11. Computer system 6 has a local file system 12 that can contain a number of files 13 and possible a database system 14. Computer system 6 includes a network interface 15 that is able to access a remote database system 16 or a remote file system 17. Access to remote database system 16 and/or a remote filesystem 17 is done through a network card in network 15 via a connection 18 to a cloud infrastructure 19. The cloud infrastructure 19 contains up to n computer systems 6.

Figure 3:
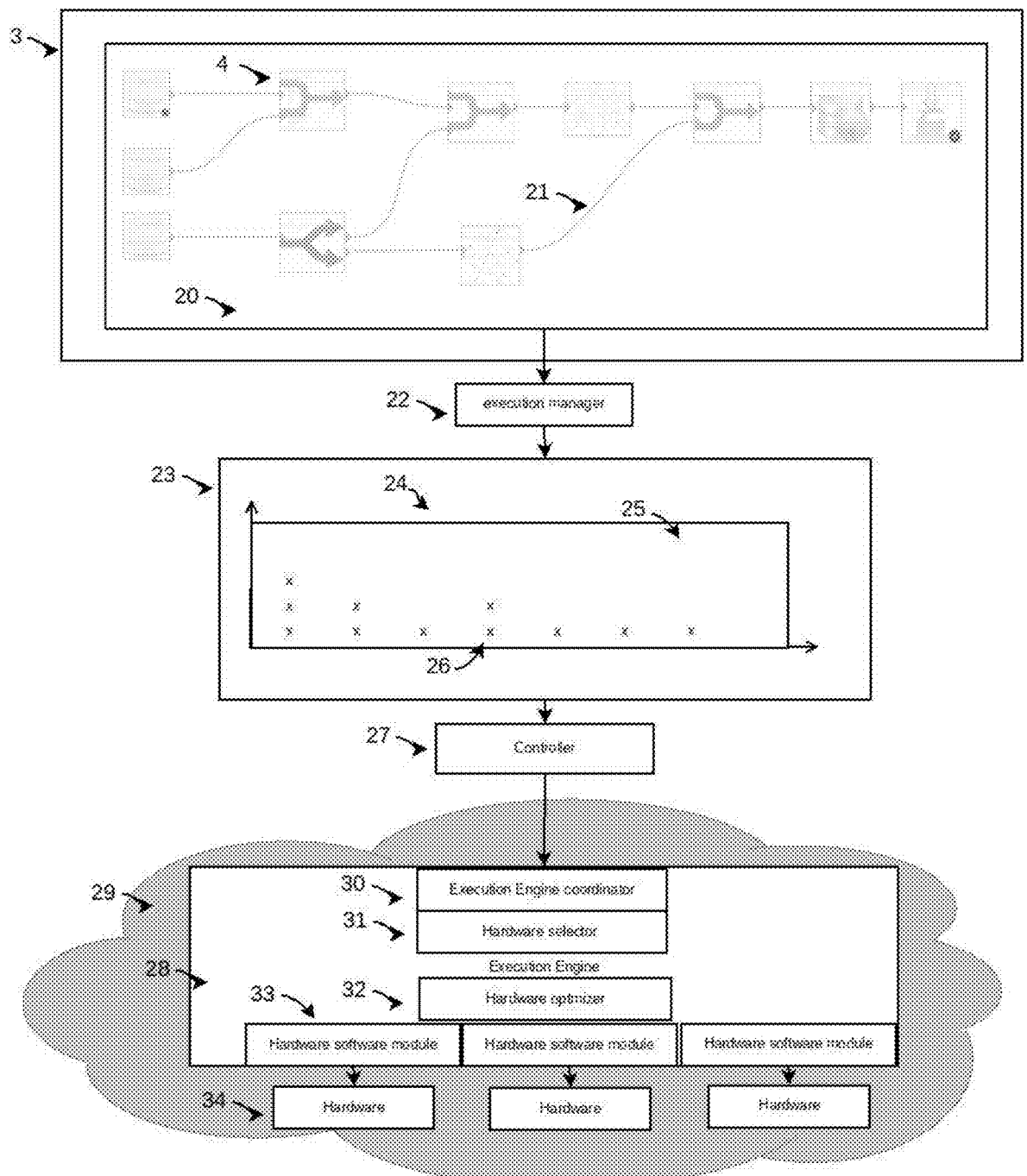
FIG. 3 Displays a graphical representation of the major components of the proposed system.

FIG. 3 Displays a graphical representation of the major components of the proposed system. The system starts with the interface system 3 that has functionality icon 4 that have the configuration that the system will execute. An execution program 20 is specified by the functionality icon 4 connected via a link 21. Once the execution program 20 is finished the program will be forwarded to an execution manager 22. The execution manager 22 will reside on the central processing system 2 which may be a typical Computer system 6. The execution manager 22 will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4.

Once the execution map 23 is completed it is passed to a controller 27 that also resides in central processing system 2. The controller coordinates the execution with an execution engine 28 across the cloud environment 29. Cloud environment 29 is composed of cloud infrastructure 19 that contains up to n computer systems 6. The controller 27 communicates to an execution engine coordinator 30 that resides on one of n computer system 6 of cloud environment 29. The execution engine coordinator 30 uses a hardware selector 31 to discriminate which component of computer systems 6 is selected. For example, hardware selector 31 can choose between execution of then cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with hardware 34.

Figure 4:
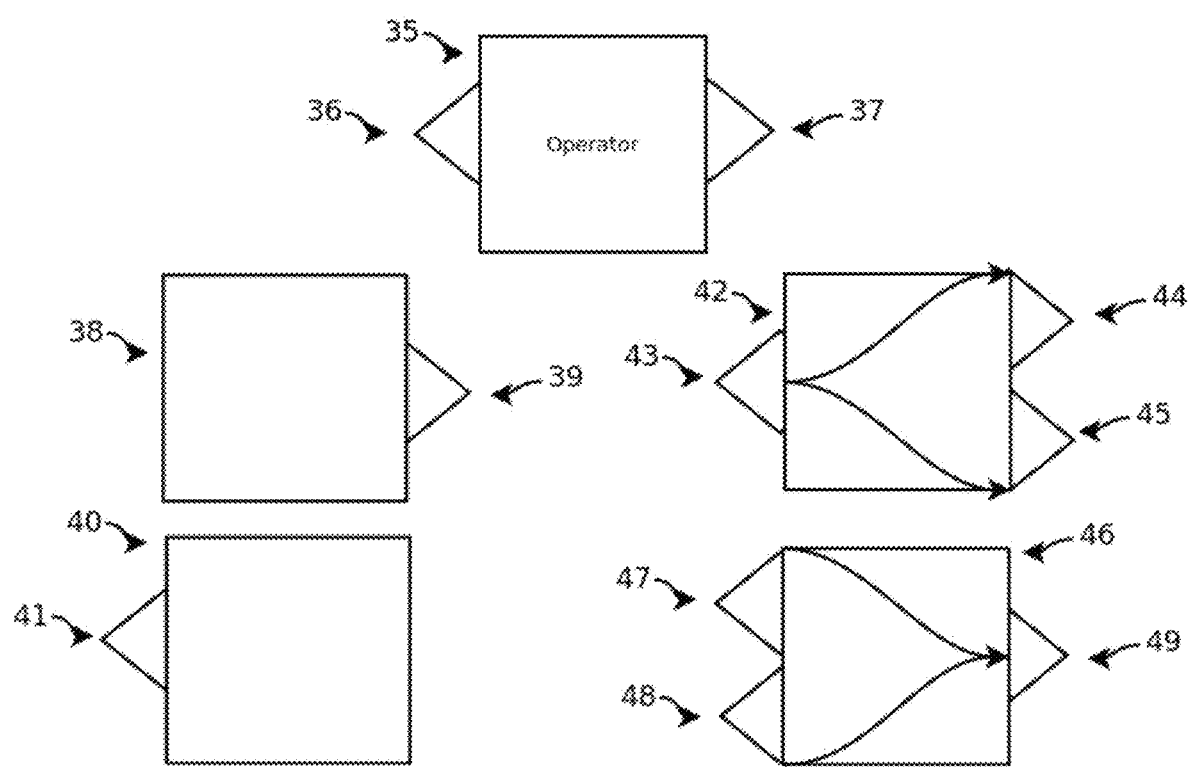
FIG. 4 Shows the categories of graphical operator elements.

FIG. 4 Shows the categories of graphical operator elements. Functionality icon 4 of interface system 3 can be divided into several icon types with specific functions that are independent of the particularity of the operations they are required to perform. FIG. 4 shows an operator 35 that has an inputlink connector 36 and an output link connector 37. The operator 35 represents an operation that has one input and one output. For example, this may represent a single instruction single datum (SISD) or single instruction multiple data operation (SIMD). An operator 38 contains an output link connector 39 representing a source operation. A source operation can usually be taken from but not limited to data extraction from a source that can be a database, file, web service, or other similar operation that does not accept an input to the operator. An operator 40 contains an input link connector 41 representing a destination operation. A destination operation can usually be taken from but not limited to data storage such as insertion to a database, file, web service or other operation that only accepts an input to the operator.

An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. The split can take the form of copying the data, dividing the data in half or even applying particular criteria for division. Finally, an operator 46 represents a join operation. The operator 46 has an input link connector 47 and an input link connector 48. The operator 46 also contains an output link connector 49. The join operation carried out by operator 46 takes two datastreams through input link connector 47 and input link connector 48 and joining the data stream into a single output that is sent to output link connector 49.

Figure 5:
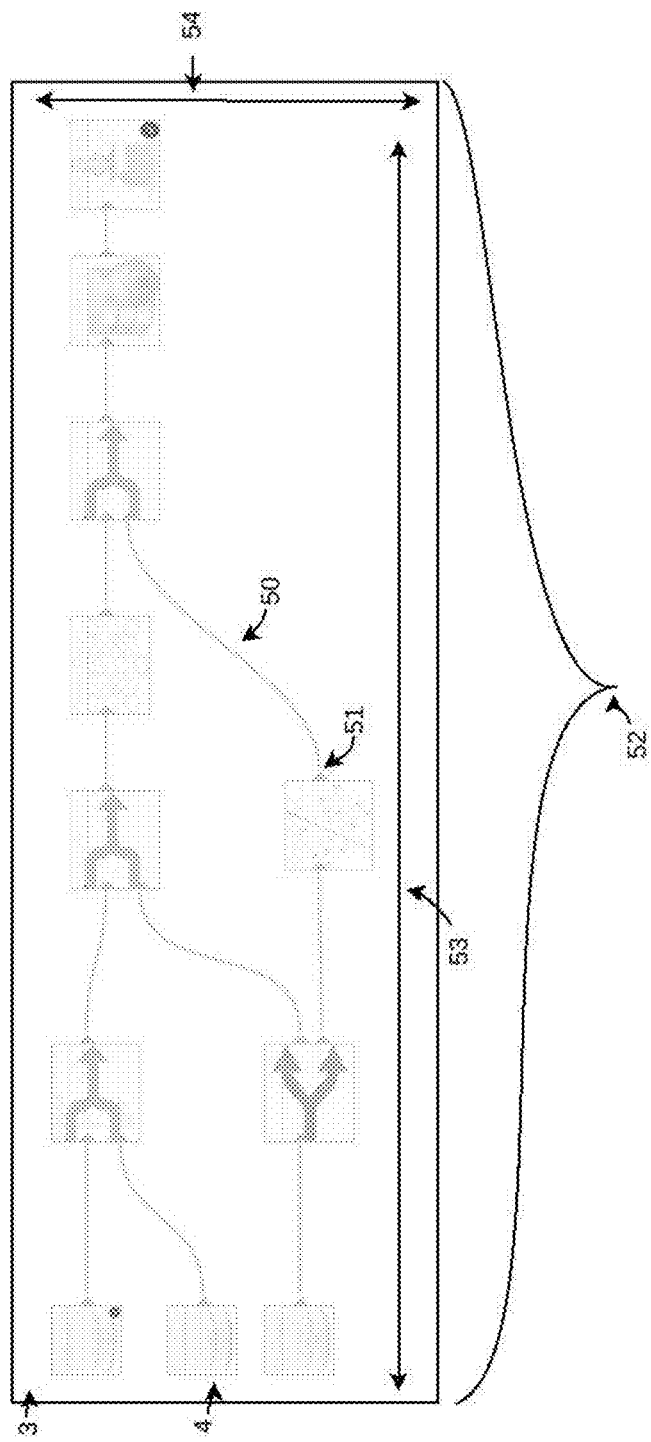
FIG. 5 Shows a representative example of a processing flow in the interface system.

FIG. 5 Shows a representative example of a processing flow in the interface system 3 using functionality icon 4 along with a link 50. Link 50 is connected to functionality icon 4 via a link connector 51. The interface system 3 spans a canvas 52 with a width 53 and height 54 where you can place a plurality of icon 4 and link 50.

Figure 6:
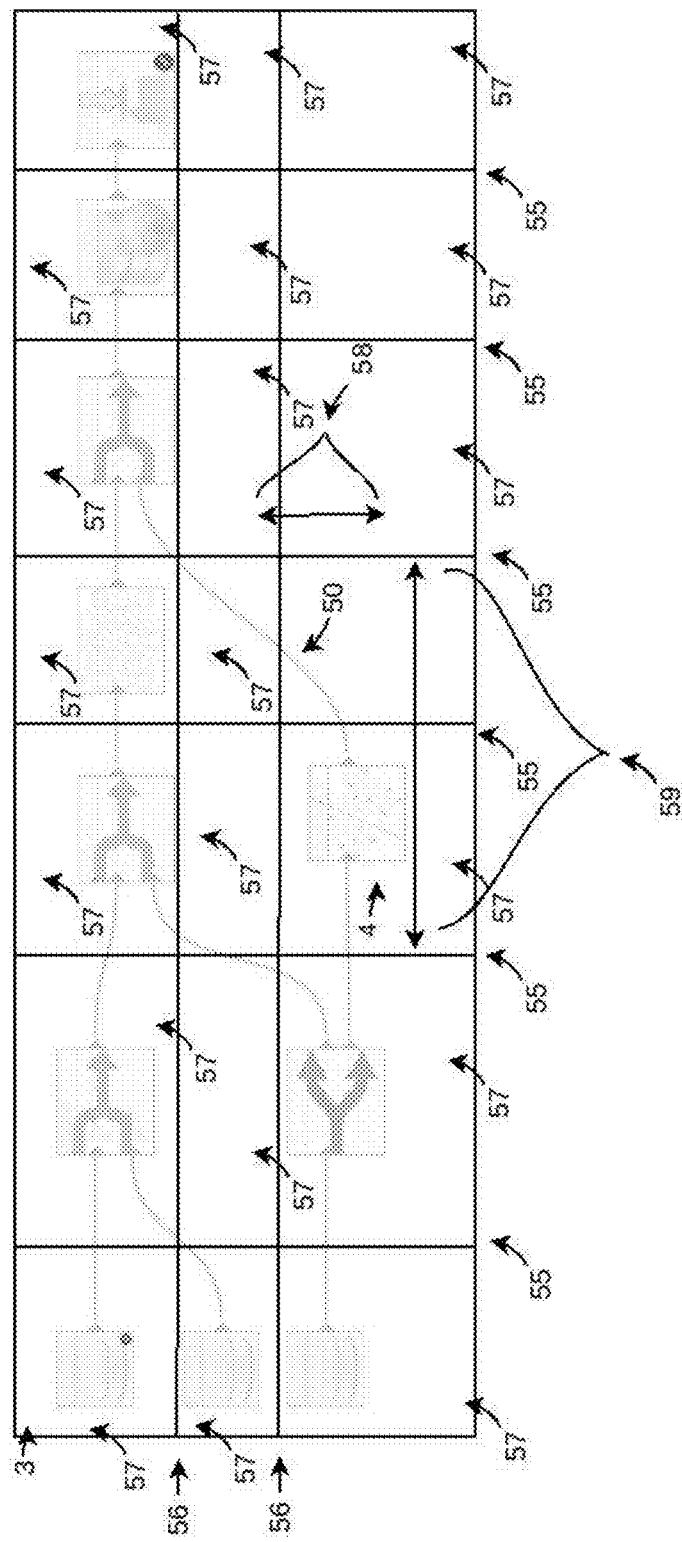
FIG. 6 Shows a segmentation of the interface system map for parallel execution.

FIG. 6 Shows a segmentation of the interface system map for parallel execution manager 22. The plurality of functionality icon 4 and link connector 51 are segmented via a vertical line 55 and a horizontal line 56 into a cell 57. Empty cells can create a vertical slack 58 or a horizontal slack 59 in the interface system map that will be used by the controller 27.

Figure 7:
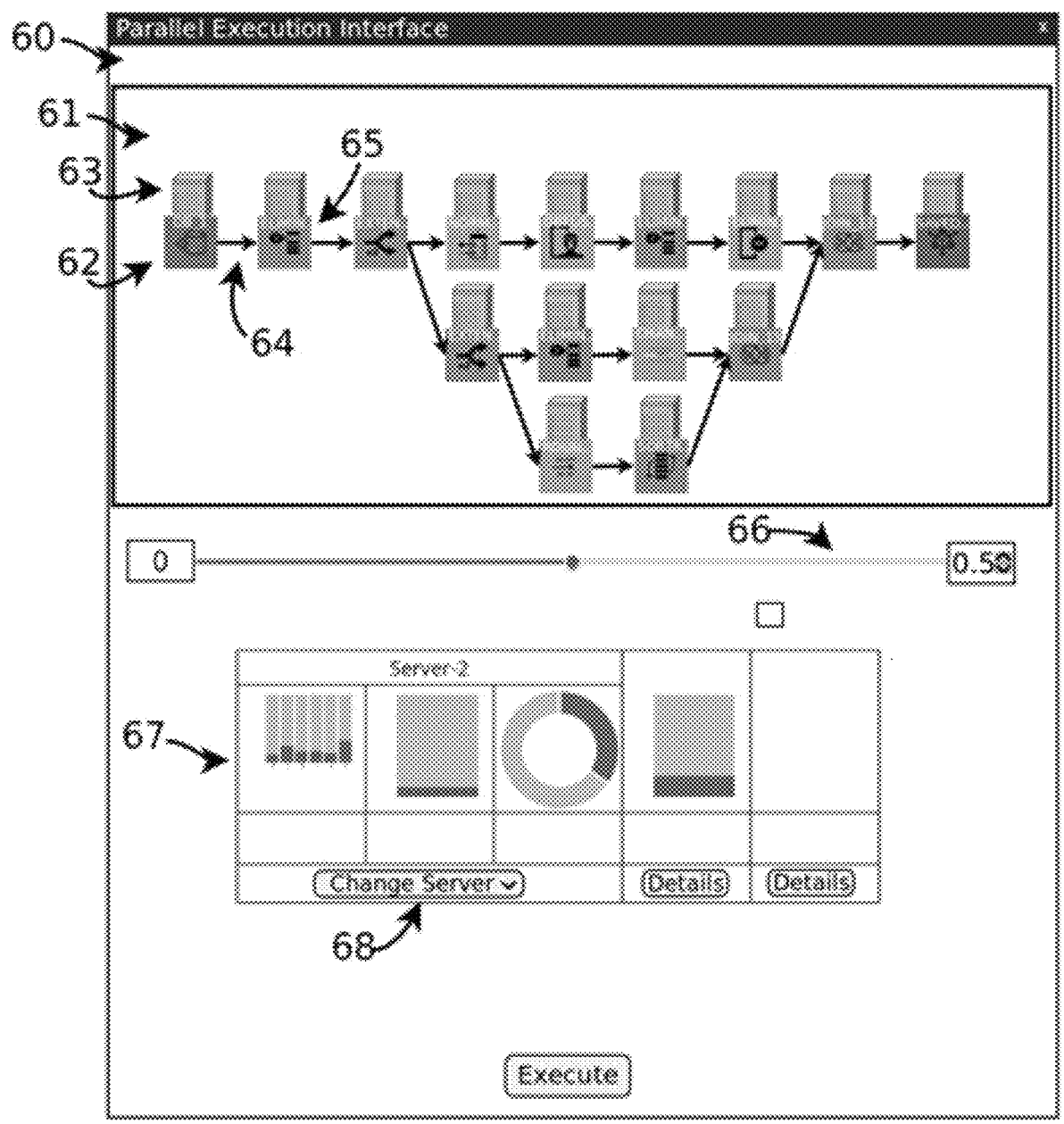
FIG. 7 Shows a graphical representation of a workflow alongside the underlying computer system on which it is going to execute.

FIG. 7 Shows a graphical representation of a workflow alongside the underlying computer system on which it is going to execute. An interface 60 displays a canvas 61 that contains a graphical representation of an operator 62 displayed on top of a computer 63 that will execute the underlying program which the operator 62 represents. The computer 63 forms part of the distributed architecture 5. A link 64 connects the operator 62 with an operator 65 that follows from the programmed execution sequence provided by the user. The information contained in the canvas 61 allows for the display of the order of execution of the workflow by specifying how the operators are interconnected to one another through the links provided in the representation.

The interface 60 also includes a slider 66 that controls the fade in fade out of the operators to allow clearer view of the computer arrangement. The slider 66 contains the value of 0.5 to display both the operators and underlying computer systems. The interface further includes an interface 67 that displays computer 63 attributes such as number of processors, number of cores per processor, available memory, storage utilization and their respective capacity and loads. An interface menu 68 allows to display other computer 63 attributes.

Figure 8:
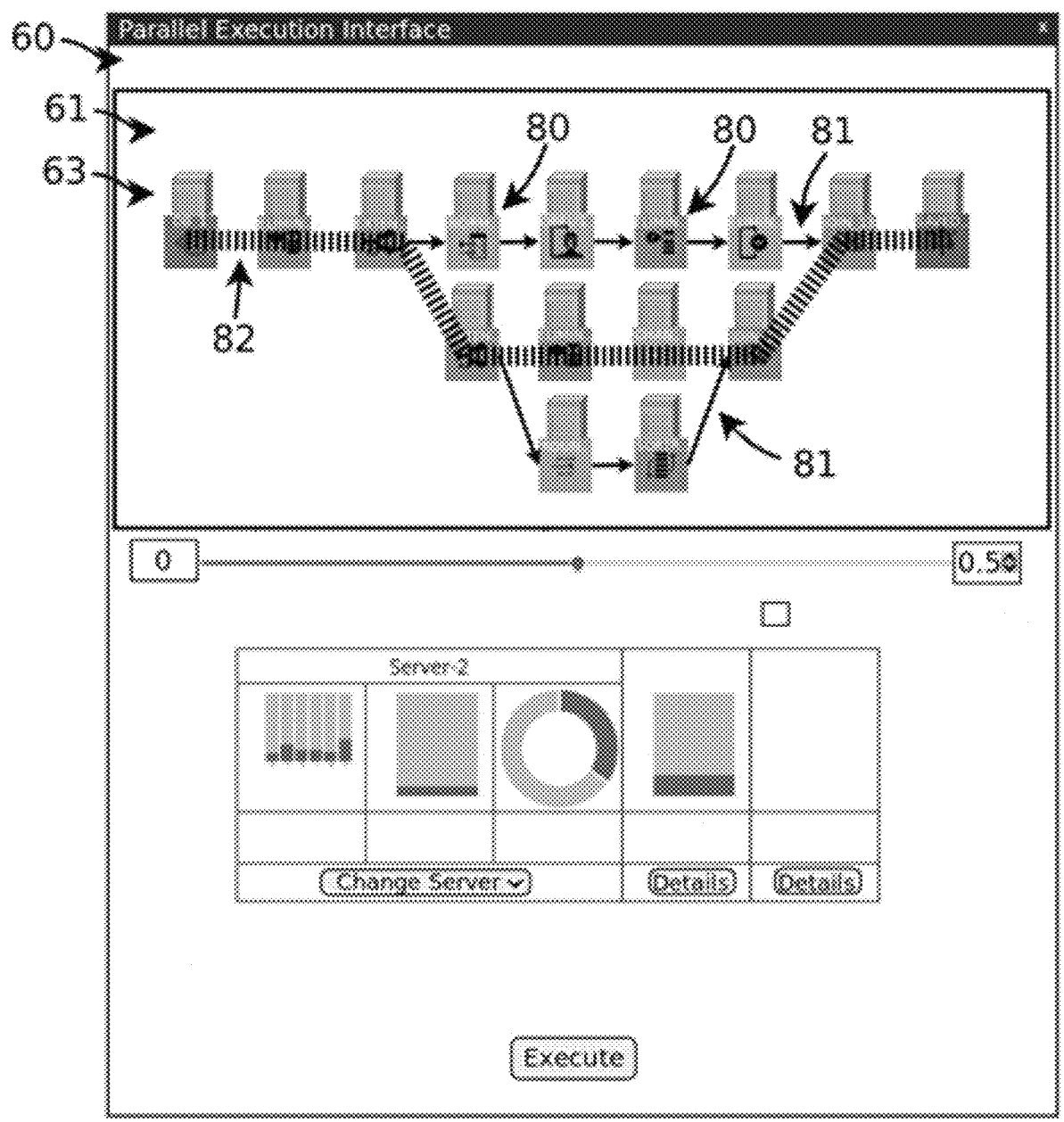
FIG. 8 Shows a graphical representation of the critical path calculated from the workflow.

FIG. 8 Shows a graphical representation of the critical path calculated from the workflow by the execution manager 22. The FIG. 7 shows the interface 60. The interface 60 displays the canvas 61 that includes a plurality of operators 80 connected by a plurality of links 81 which make up a typical workflow configured by the user through a terminal 1. The canvas 61 also includes a graphical representation of a critical path 82. The critical path 82 makes a path on the workflow that identifies the longest running execution sequence that needs resource prioritization based on the cumulative execution time of individual operators representing underlying execution tasks. Other paths besides the critical path will finish before the critical path. This makes the critical path the one that requires the best resources to minimize the execution since it would delay the time to complete the whole workflow. The execution time of the particular task is determined by the attributes of the program such as running complexity, storage access time and other relevant attributes. The prioritization identifies the computer 63 that has the best resources to process the longest running sequence.

Figure 9:
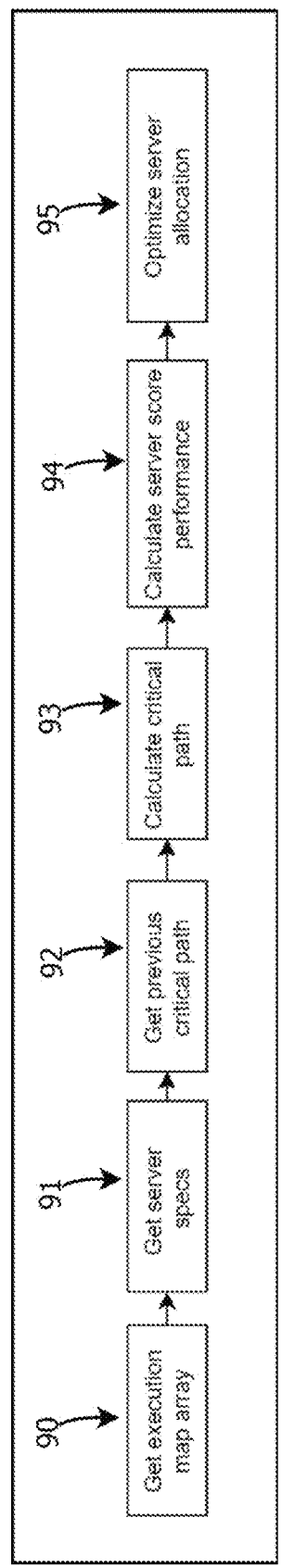
FIG. 9 Shows a block diagram of the process that determines the critical path for the flow execution and assigns the optimal computer for each operator in the critical path.

FIG. 9 Shows a block diagram of the process that determines the critical path for the flow execution and assigns the optimal computer for each operator in the critical path processed by the execution manager 22. The process starts with a step 90 by receiving the execution matrix 24 that stores the order of the execution given by the functionality icons 4 and links 21. The step 90 is followed by a step 91 that will receive the computer attributes (e.g. such as number of processors, number of cores perprocessor, available memory, storage utilization and their respective capacity and loads.) from each computer 62 available. A step 92 follows the step 91. The step 92 receives the previous critical path parameters if previously executed, if not it will receive empty parameters. A step 93 follows step 92. The step 93 calculates a new critical path from the execution matrix 24 and identifies the functionality icons 4 and links 21 that are part of the new critical path. The step 93 is followed by a step 94 that identifies the optimal computer layout in ascending order based on the computer attributes from each computer 62 available. A step 95 follows the step 94. The step 95 will rearrange the operator server allocation to optimize the execution time of the execution matrix 24.

Figure 10:
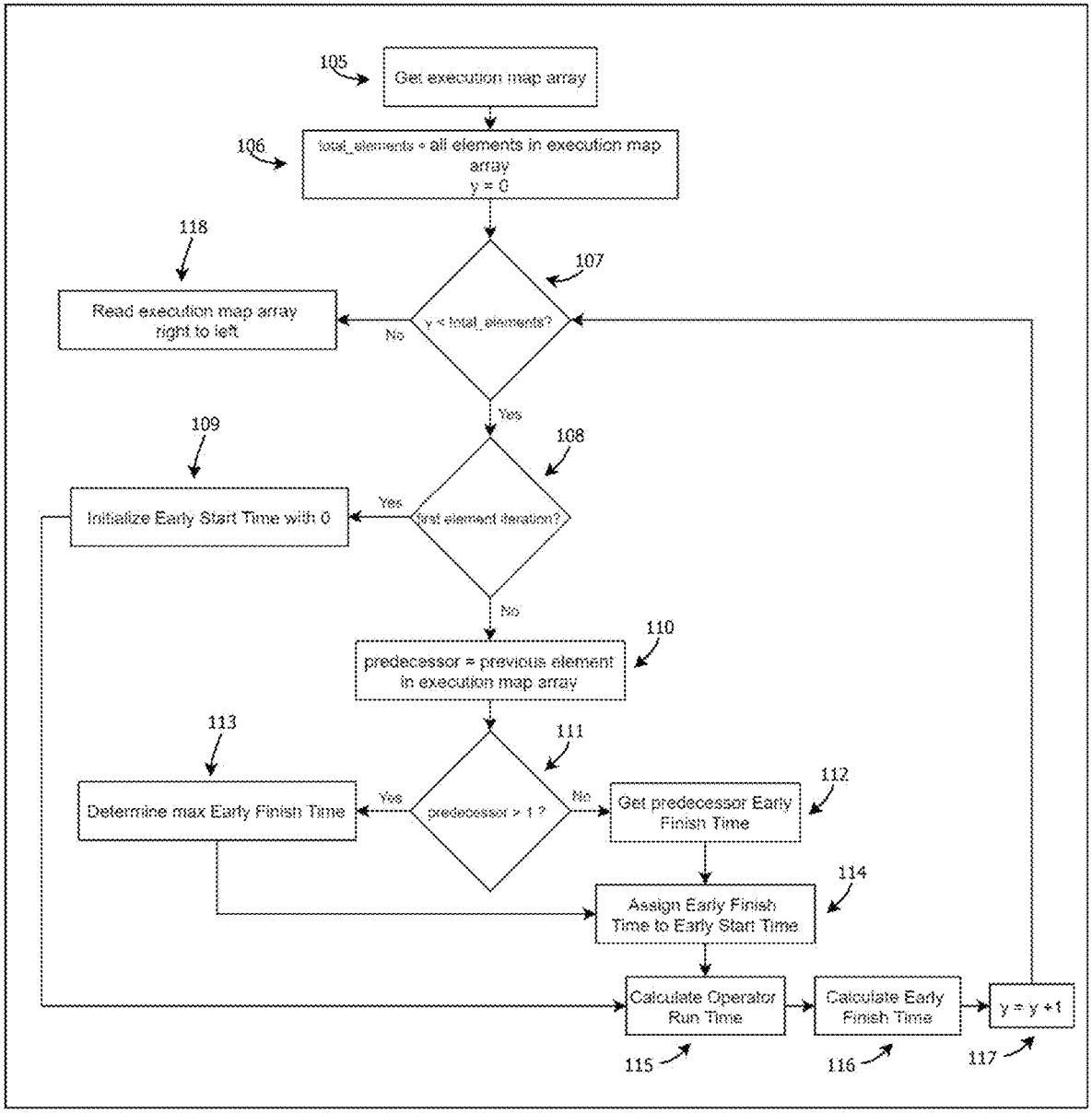
FIG. 10 Shows a flowchart of the execution matrix interpretation from left to right to do the calculation of the initial values necessary for determining the critical path.

FIG. 10 Shows a flowchart of the execution matrix 24 interpretation from left to right to do the calculation of the initial values necessary for determining the critical path. The process starts at a step 105 that gets the execution matrix 24 from the configuration made by the user. The step 105 is followed by a step 106 that determines the quantity of total elements in the execution matrix 24 and sets the loop counter y to an initial value of zero. The loop counter y and total elements size of step 106 are used in a step 107 where the counter is compared to the total elements size. If the y counter is less than the total elements size the process at step 107 continues to a step 108 that will validate if it's the first element iteration of the execution matrix 24. If the element being evaluated at step 108 is the first of the execution matrix 24 the process continues to a step 109 that will set the early start time of the element being evaluated to zero.

If the element being evaluated at step 108 is not the first of the execution matrix 24 the process continues to a step 110 that will set the predecessor with the element that precedes the current element. Step 110 is followed by a step 111 that will evaluate if the predecessor contains more than one element. If the predecessor at step 111 does not contain more than one element the process continues to a step 112 that will retrieve the early finish time of the predecessor. If the predecessor at step 111 contains more than one element the process continues to a step 113 that will determine the max early finish time of the predecessor. Finishing step 112 and also step 113 causes a step 114 to assign the early finish time of the predecessor element to the early start time of the element. Finishing step 114 and also step 109 causes a step 115 to calculate the element run time that it took to finish the execution of the task. A step 116 follows step 115 where the early finish time of the element is calculated by adding the element runtime from step 115 and the early start time from step 114. Once step 116 is done a step 117 will increment the y counter by one. A step 118 occurs if a step 107 determines that the y counter is greater than the total elements size, finishing the execution matrix 24 interpretation from left to right.

Figure 11:
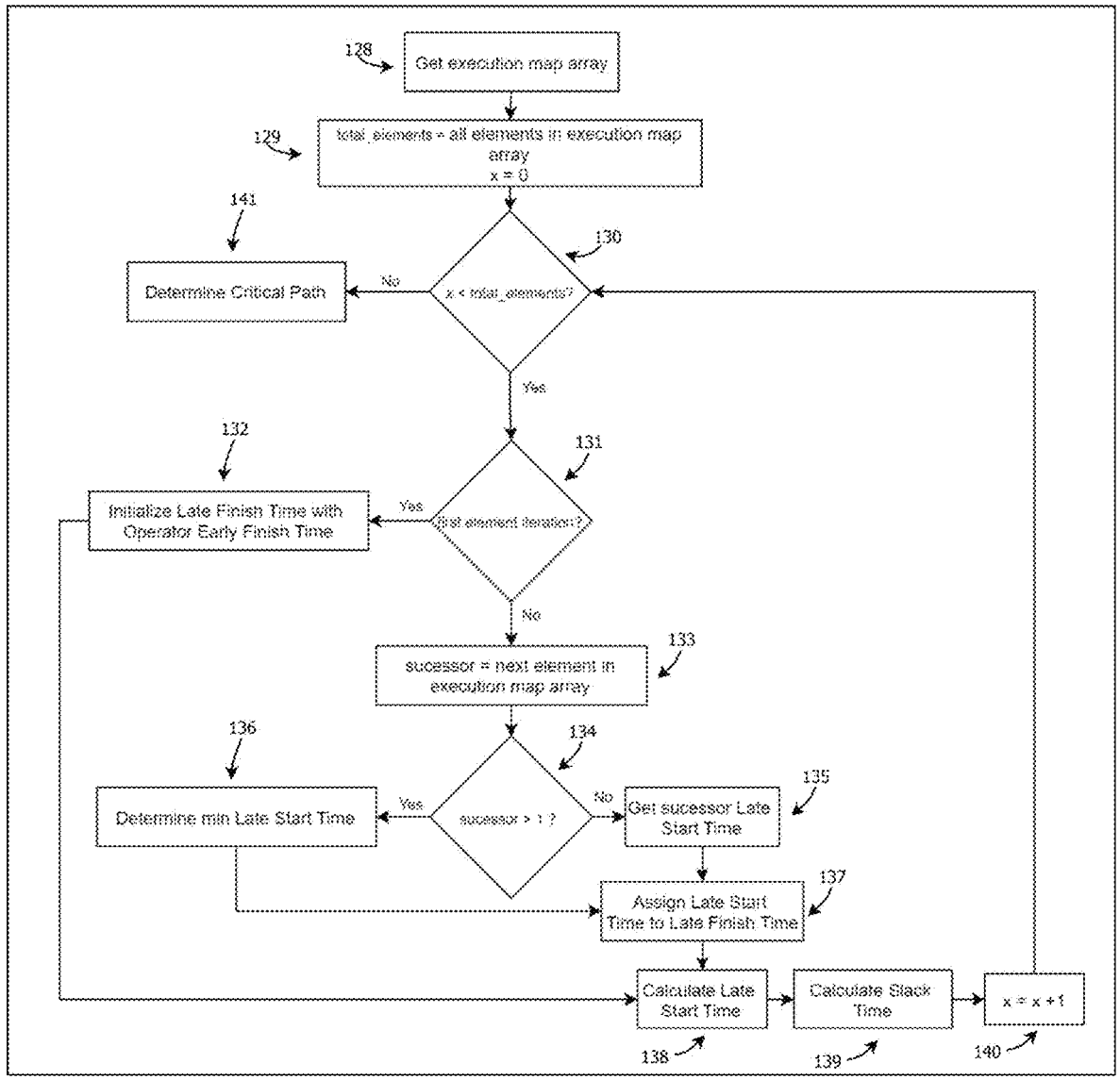
FIG. 11 Shows a flowchart of the execution matrix interpretation from right to left to do the calculation of the final values necessary for determining the critical path.

FIG. 11 Shows a flowchart of the execution matrix 24 interpretation from right to left to do the calculation of the final values necessary for determining the critical path. The process starts at a step 128 that gets the execution matrix 24 from the configuration made by the user. The step 128 is followed by a step 129 that determines the quantity of total elements in the execution matrix 24 and sets the counter x to an initial value of zero. The x counter and total elements size of step 129 are used in a step 130 where the counter is compared to the total elements size. If the x counter is less than the total elements size the process at step 130 continues to a step 131 that will validate if it's the first element iteration of the execution matrix 24. If the element being evaluated at step 131 is the first of the execution matrix 24 the process continues to a step 132 that will set the late finish time of the element being evaluated to the early finish time from step 116 in FIG. 10. If the element being evaluated at step 131 is not the first of the execution matrix 24 the process continues to a step 133 that will set the successor with the element after the current element. Step 133 is followed by a step 134 that will evaluate if the successor contains more than one element.

If the successor at step 134 does not contain more than one element the process continues to a step 135 that will retrieve the late start time of the successor. If the successor at step 134 contains more than one element the process continues to a step 136 that will determine the minimum late start time of the successor. Finishing step 135 and also step 136 causes a step 137 to assign the late start time of the successor element to the late finish time of the element. Finishing step 137 and also step 132 causes a step 138 to calculate the element late start time by subtracting the late finish time from step 132 or step 137 by the run time from step 115 in FIG. 10. A step 139 follows step 138 where the slack time of the element is calculated by subtracting the late start time from step 138 by the early start time from step 114 in FIG. 10. Once step 139 is done a step 140 will increment the x counter by one. A step 141 occurs if a step 130 determines that the x counter is greater than the total elements size, finishing the execution matrix 24 interpretation from right to left.

Figure 12:
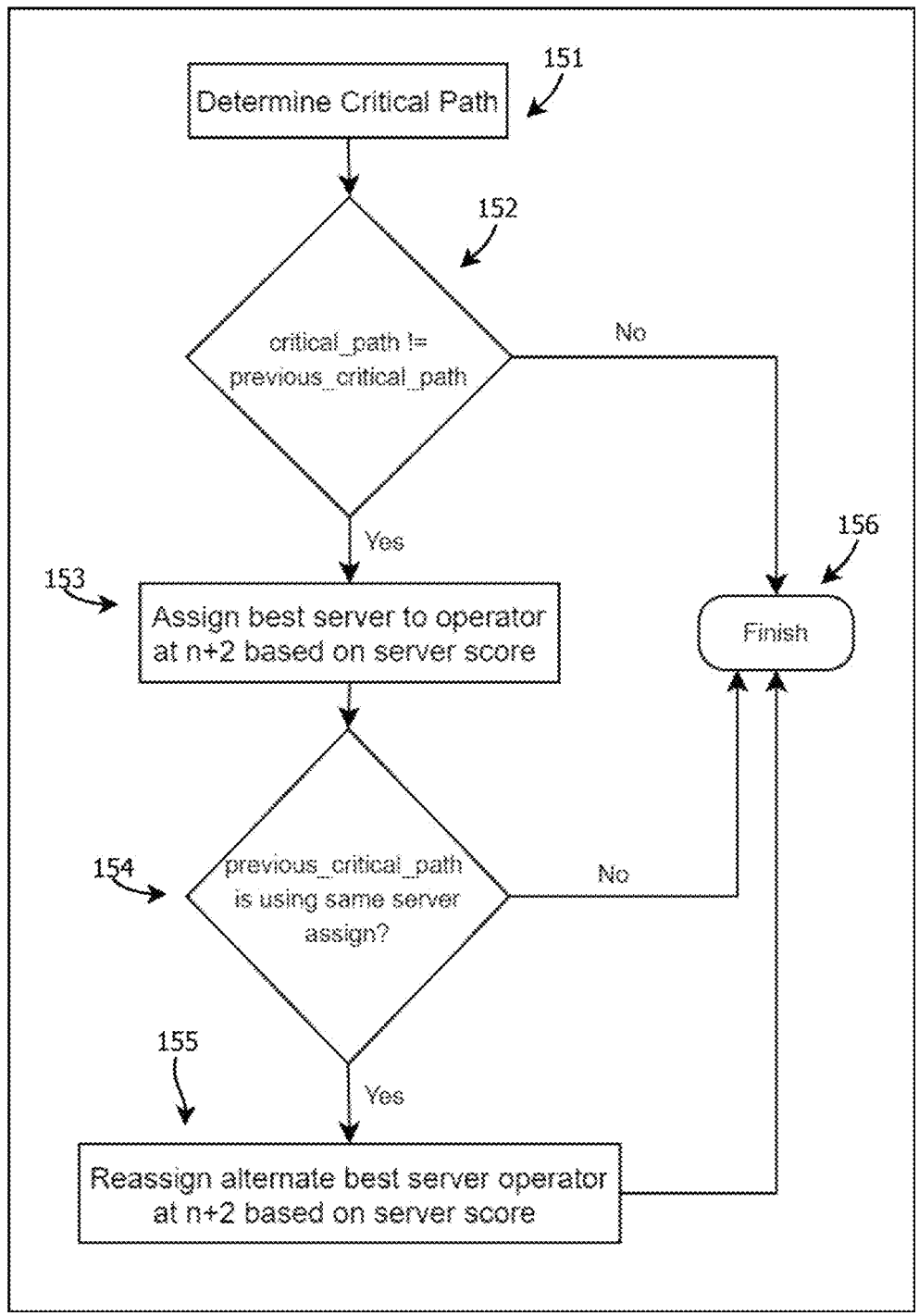
FIG. 12 Shows a flowchart of the process to determine the critical path and the optimization of the execution matrix by rearranging the operator server allocation.

FIG. 12 Shows a flowchart of the process to determine the critical path and the optimization of the execution matrix 24 by rearranging the operator server allocation. The process starts at a step 151 where the critical path is determined by identifying the operators that contain a slack time equal to zero. The step 151 is followed by a step 152 where the new critical path of step 151 is compared to the previous critical path. If the new critical path is different than the previous critical path the process at step 152 continues to a step 153 that will assign the optimal computer based on the computer attributes from each computer available to the operators positioned at n+2 and thereafter that are part of the critical path. Once step 153 is done a step 154 will validate if the previous critical path server allocation is the same as the new critical path server allocation. If the previous critical path server allocation is the same as the new critical path server allocation the process continues to a step 155 that will reassign a different optimal computer to the previous critical path operators positioned at n+2 and thereafter. A step 156 to terminate the process occurs if the step 152 determines that the new critical path is not different than the previous critical path, or the step 154 determines that the previous critical path server allocation is different than the new critical path or after step 155 is done.

Figure 13:
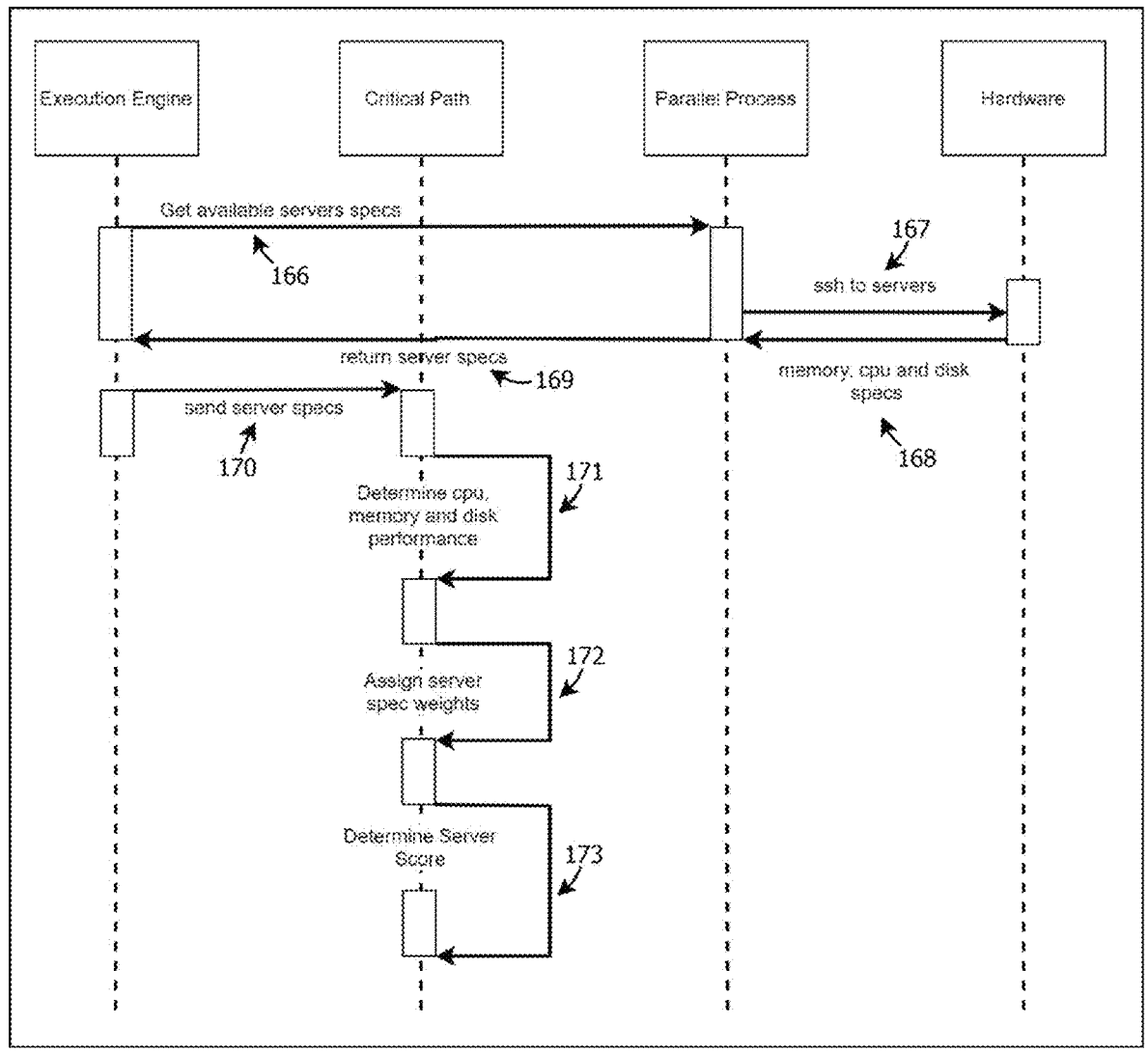
FIG. 13 Shows a sequence diagram of the components that determine the server score performance.

FIG. 13 Shows a sequence diagram of the components that determine the server score performance. A step 166 is when the execution engine requests the available computer attributes through the parallel process. A step 167 follows step 166 where the parallel process connects trough ssh to the computer to access the hardware attributes. After successful connection of step 167 the hardware attributes of each available computer is retrieved in a step 168. A step 169 returns the computer hardware attribute values of step 168 to the execution engine. Once step 169 is finished a step 170 will send the computer hardware attribute values to the critical path evaluation process. A step 171 will extract the hardware attribute values from each computer such as number of processors, number of cores per processor, available memory, storage utilization and their respective capacity and loads. After completion of step 171 a step 172 will assign a customizable weight value based on the computer attribute that will be prioritized. The weigh value from step 172 will be used in a step 173 to determine the server score and build an optimal computer layout in ascending order based on the score result.

Figure 14:
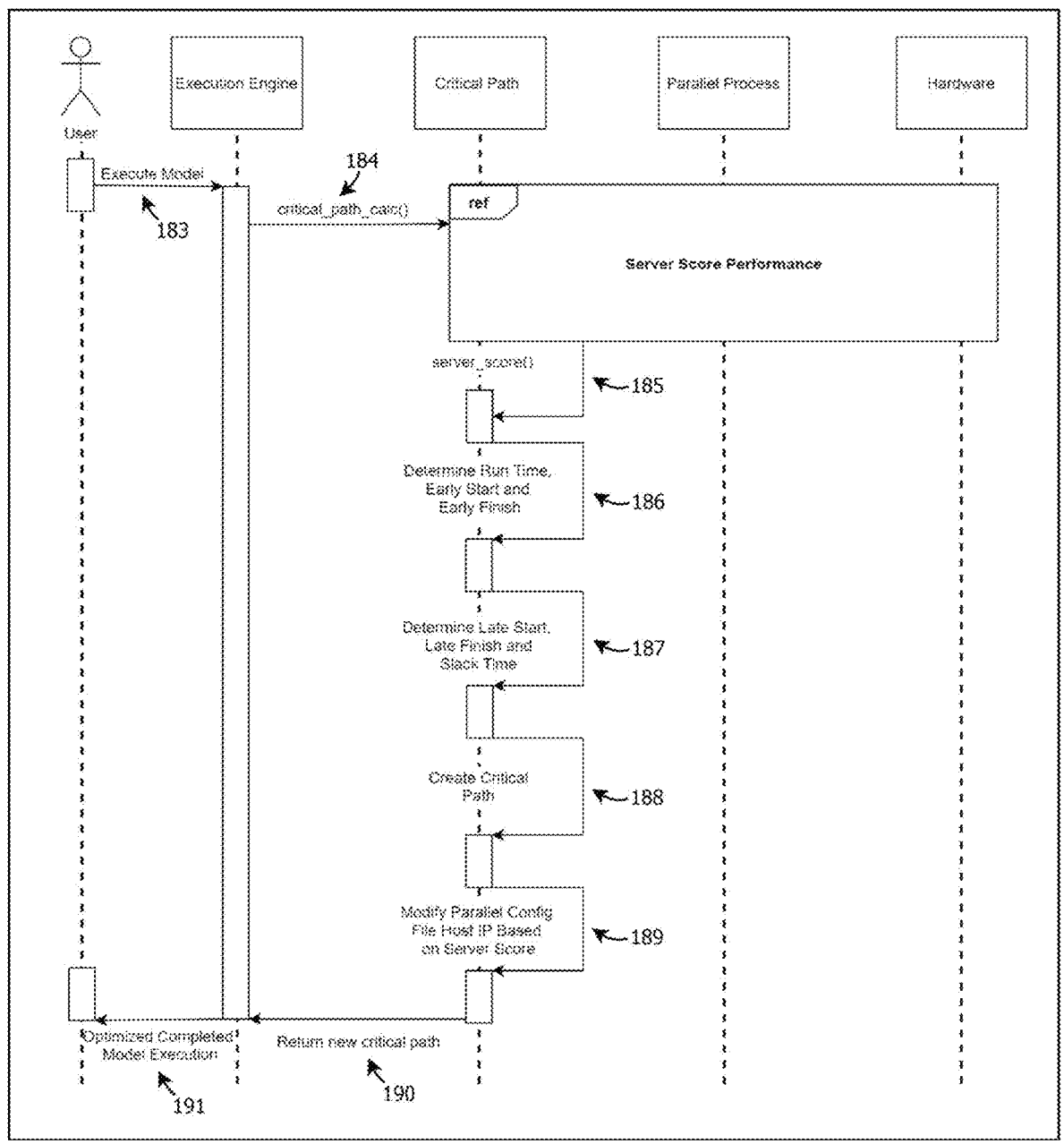
FIG. 14 Shows a sequence diagram of the process that determines the critical path and optimizes the execution matrix.

FIG. 14 Shows a sequence diagram of the process that determines the critical path and optimizes the execution matrix 24. A step 183 is when the user initiates the model execution through the execution engine. A step 184 follows step 183 where the critical path process will start the evaluation by first determining the server score performance from FIG. 13. A step 185 follows the server score performance to return the server score that will be used for the critical path evaluation process. Once step 185 is finished a step 186 will determine the initial values from the execution matrix 24 interpretation from left to right in FIG. 10 including operator run time, early start time and early finish time. A step 187 follows step 186 to determine the final values from the execution matrix 24 interpretation from right to left in FIG. 11 including late start time, late finish time and slack time. After completion of step 187 the critical path will be determined in a step 188. Step 188 will determine the critical path based on the operator slack time from step 187 equal to zero. Once step 188 is finished a step 189 will rearrange the execution matrix 24 by assigning the optimal computer IP to the operators from the critical path based on the sever score performance of step 185. The critical path will send the new critical path information from step 189 to a step 190 that is received by the execution engine. The step 190 will complete the model execution based on the new critical path from step 189 and return the results to a step 191 received by the user.

Figure 15:
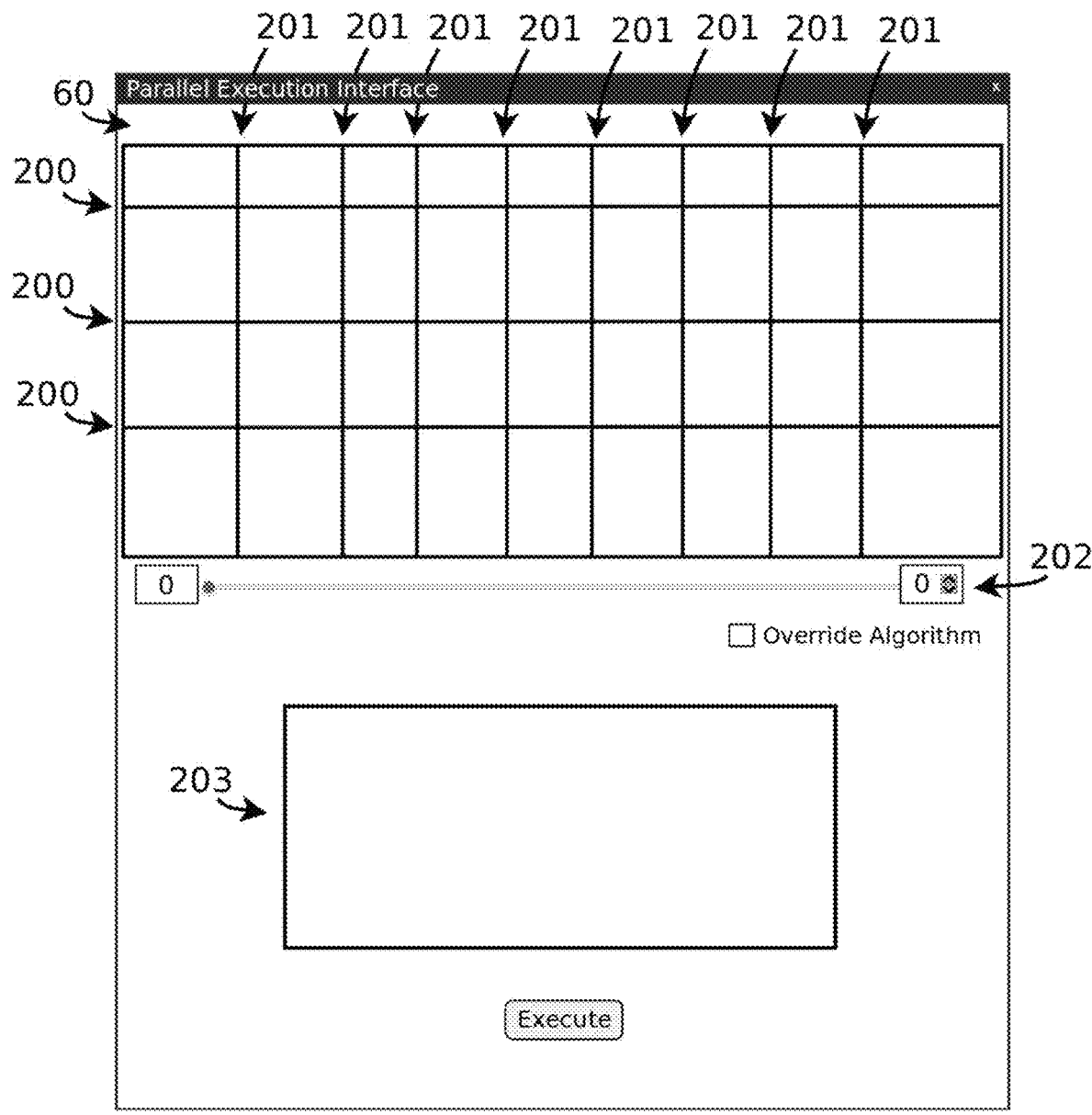
FIG. 15 Shows a graphical user interface for workflow processing to calculate the critical path.

FIG. 15 Shows a graphical user interface for workflow processing to calculate the critical path. The interface 60 displays the execution matrix 24 by a combination of horizontal lines 200 and vertical lines 201 that will store the order of the workflow. A slider 202 will contain the value O to only display the underlying resource and fade out the icons representing the object utilizing the resource to allow clearer view of the computer arrangement. A properties display slot 203 will have the information pertaining the resource or the operator that is selected for display. The critical path will be displayed as in FIG. 7 where the operators represent computational or non-computational resources and the icons belonging to computer 63 are more general resources. The graphical display can then be used to process and display the critical path and its corresponding optimizations for non-computational tasks.

The graphical user interface may be alternatively used in industrial engineering applications and processes besides computing processes.

What is claimed:

1. A computer-implemented method comprising:
 displaying, on a graphical user interface, a canvas graphical representation of a transactional workflow having a plurality of functionality icons representing operators placed on the canvas, wherein:
  each of the functionality icons are connected together by at least one link,
  an execution map of the transactional workflow comprises a plurality of columns and rows within a grid,
  each entry of a plurality of entries in the execution map has a corresponding execution slot for an execution task of the transactional workflow corresponding to a functionality icon,
  the execution slots are placed in a programmed execution sequence displaying an order of execution of the transactional workflow, and
  the order of execution specifies how the operators are connected to one another through the at least one link provided in the canvas graphical representation;
 receiving values of hardware attributes from each computer server of a plurality of computer servers including: a number of processors, a number of cores per processor, an available memory, a storage utilization, a respective capacity, or respective loads, wherein;
  an optimal layout of the plurality of computer servers displayed in ascending order on the graphical user interface is based on a server score,
  the server score is based on a customizable weight value, and
  the customizable weight value is based on a prioritization of the hardware attributes; and
 executing the transactional workflow, wherein:
  an initial critical path of the execution of the transactional workflow is based on operators containing a slack time equal to zero, and
  when the initial critical path changes to a new critical path, executing an execution task of the transactional workflow using an optimal computer server based on the hardware attributes from each computer server available to the operators positioned at a particular location and thereafter in the ascending order of the optimal layout that are part of the new critical path.

2. The method of claim 1, wherein the graphical user interface is used in industrial engineering processes.

3. The method of claim 1, wherein the grid comprises a plurality of horizontal lines and vertical lines.

4. The method of claim 1, wherein the operators include at least one of a split operation and a join operation.

5. The method of claim 1, wherein the operators include at least one of an input link connector and an output link connector.

6. The method of claim 1, wherein each of the functionality icons is one of a plurality of icon types.

7. A system comprising:
 a plurality of computer servers;
 at least one processor;
 a graphical user interface; and
 a memory storing an execution program which when executed by the at least one processor executes a method comprising:
  displaying, on the graphical user interface, a canvas graphical representation of a transactional workflow having a plurality of functionality icons representing operators placed on the canvas, wherein:
   each of the functionality icons are connected together by at least one link,
   an execution map of the transactional workflow comprises a plurality of columns and rows within a grid, each entry of a plurality of entries in the execution map has a corresponding execution slot for an execution task of the transactional workflow corresponding to a functionality icon, the execution slots are placed in a programmed execution sequence displaying an order of execution of the transactional workflow, and the order of execution specifies how the operators are connected to one another through the at least one link provided in the canvas graphical representation;

receiving values of hardware attributes from each computer server of the plurality of computer servers including: a number of processors, a number of cores per processor, an available memory, a storage utilization, a respective capacity, or respective loads, wherein:

an optimal layout of the plurality of computer servers displayed in ascending order on the graphical user interface is based on a server score, the server score is based on a customizable weight value, and the customizable weight value is based on a prioritization of the hardware attributes; and executing the transactional workflow, wherein:

an initial critical path of the execution of the transactional workflow is based on operators containing a slack time equal to zero, and when the initial critical path changes to a new critical path, executing an execution task of the transactional workflow using an optimal computer server based on the hardware attributes from each computer server available to the operators positioned at a particular location and thereafter in the ascending order of the optimal layout that are part of the new critical path.

8. The system of claim 7, wherein the graphical user interface is used in industrial engineering processes.

9. The system of claim 7, wherein the grid comprises a plurality of horizontal lines and vertical lines.

10. The system of claim 7, wherein the operators include at least one of a split operation and a join operation.

11. The system of claim 7, wherein the operators include at least one of an input link connector and an output link connector.

12. The system of claim 7, wherein each of the functionality icons is one of a plurality of icon types.

13. The system of claim 7, wherein the system further comprises a controller.

14. The system of claim 7, wherein the system further comprises an execution engine.

15. The system of claim 14, wherein the execution engine comprises:

an execution engine coordinator;

a hardware selector; and a hardware optimizer.

16. The system of claim 7, wherein the graphical user interface includes a slider that controls a fade in and/or fade out of the operators.

17. The system of claim 16, wherein the graphical user interface further includes a numerical value of the slider.

18. The system of claim 7, wherein the graphical user interface includes an execute button.

19. The system of claim 7, wherein the graphical user interface includes an override algorithm option.

20. The system of claim 7, wherein the graphical user interface includes a properties display slot containing information pertaining to a resource or an operator selected for display on the graphical user interface.

* * * * *